United States Patent [19]
Lai

[11] Patent Number: 5,915,508
[45] Date of Patent: Jun. 29, 1999

[54] TUNED MASS DAMPER

[75] Inventor: Ming-Lai Lai, Lake Elmo, Minn.

[73] Assignee: Minnesota Mining and Manufacturing Company, St. Paul, Minn.

[21] Appl. No.: 08/719,974

[22] Filed: Sep. 23, 1996

Related U.S. Application Data

[63] Continuation-in-part of application No. 08/401,973, Mar. 9, 1995, Pat. No. 5,558,191, which is a continuation-in-part of application No. 08/228,645, Apr. 18, 1994, abandoned.

[51] Int. Cl.$^6$ .................................................. F16F 7/10
[52] U.S. Cl. ........................... 188/379; 267/33; 267/136; 52/167.2; 52/167.5
[58] Field of Search ................................. 188/378, 379, 188/380; 207/195, 292, 293, 136, 152, 153, 174, 33; 54/167.2, 167.4, 167.8

[56] References Cited

U.S. PATENT DOCUMENTS

| | | |
|---|---|---|
| 3,605,953 | 9/1971 | Caldwell . |
| 3,668,939 | 6/1972 | Schrader . |
| 4,371,858 | 2/1983 | Kandi et al. . |

FOREIGN PATENT DOCUMENTS

| | | |
|---|---|---|
| 0 089 311 | 9/1983 | European Pat. Off. . |
| 0 342 074 | 11/1989 | European Pat. Off. . |
| 0 509 911 | 10/1992 | European Pat. Off. . |
| 0 583 868 | 2/1994 | European Pat. Off. . |
| 40-11-367 | 10/1991 | Germany . |
| 53-81-864 | 7/1978 | Japan . |
| 86-646 | 5/1982 | Japan . |
| 61-12569 | 1/1986 | Japan . |
| 62-328916 | 12/1987 | Japan . |
| 63-53331 | 3/1988 | Japan . |
| 98-727 | 4/1989 | Japan . |
| 3-163239 | 7/1991 | Japan . |
| 4-64743 | 2/1992 | Japan . |
| 5-302642 | 11/1993 | Japan . |
| 8-128228 | 5/1996 | Japan . |
| 14-67-281 | 3/1989 | U.S.S.R. . |
| WO 95/28577 | 10/1995 | WIPO . |

OTHER PUBLICATIONS

Chang et al., K.C., Viscoelastic Dampers as Energy Dissipation, Earthquake Spectra, vol. 9, No. 3, 1993, pp. 371–387.

Fatch et al., Seismic Retrofit of Nonductile Reinforced Concrete Frames Using Viscoelastic Dampers, Proceedings of Seminar on Seismic Isolation, Passive Energy Dissipation, and Active Control, Applied Technology Council, pp. 604–615.

(List continued on next page.)

*Primary Examiner*—Peter M. Poon

[57] ABSTRACT

An apparatus for damping dynamic response in a primary structure in one, two or three dimensions, includes a secondary mass, and a spring and a viscoelastic element, the spring and viscoelastic element interposed between the primary structure and the secondary mass. The apparatus may include a housing for the secondary mass, the spring and the viscoelastic element, should the spring, viscoelastic element, or both the spring and viscoelastic element, be interposed between the secondary mass and the housing. A method for damping dynamic response in a primary structure in one, two or three dimensions is also disclosed.

8 Claims, 9 Drawing Sheets

OTHER PUBLICATIONS

Mahmoodi, P., Structural Dampers, Journal of the Structural Division, Proceedings of the American Society of Civil Engineers, Aug., 1969, pp. 1661–1672.

Keel et al., Design of Viscoelastic Dampers for Columbia Center Building, Building Motion in Wind, American Society of Civil Engineers, Apr. 8, 1986, pp. 65–82.

Yamaguchi, H., Vibrations Of A Beam With An Absorber Consisting of A Viscoelastic Beam And A Spring–Viscous Damper, Journal of Sound and Vibration, 103(3) (1985), pp. 417–425.

Kim, K.J. et al., Application of Viscoelastic Material for a Dynamic Damper, Journal of Vibration Acoustics, Stress and Rehability in Design, Jul. 1986, vol. 108, pp. 378–381.

Halvorsen et al., Use of Rubber Materials in Tuned Dampers For Vibration and Noise Control, Rubbercon '88, pp. 1361–1377.

Mahmoodi, P. et al., Analysis and the Design of Multi–Layer Viscoelastic (VE) Damper for Tall Structures, Proceedings of Structures Congress 1989, ASCE, May 1989, San Francisco, CA.

Mahmoodi, P., Design and Analysis of Viscoelastic Vibration Dampers for Structures, 3M Industrial Specialities Division.

Scotchdamp Viscoelastic Polymers—Suggested Purchase Specification, 3M Industrial Specialities Division 70–0702–0225–7(89.3)R1.

Mahmoodi et al., P., Performance of Viscoelastic Dampers in World Trade Center Towers, ASCE, Structures Congress, Aug. 17–20, 1987, Orlando, FL.

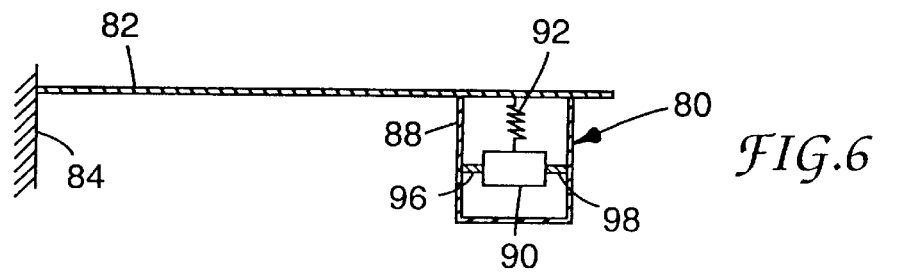
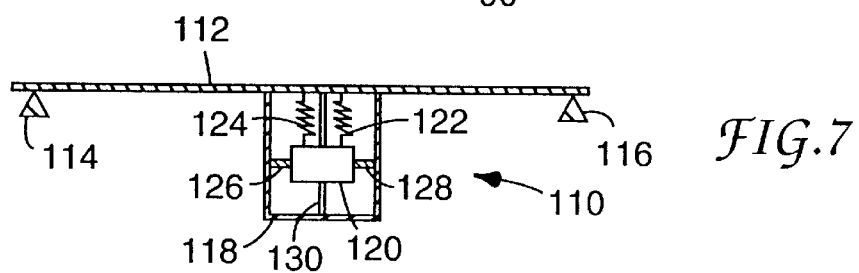
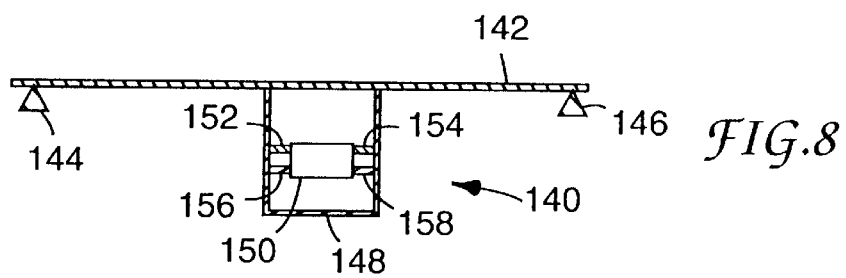
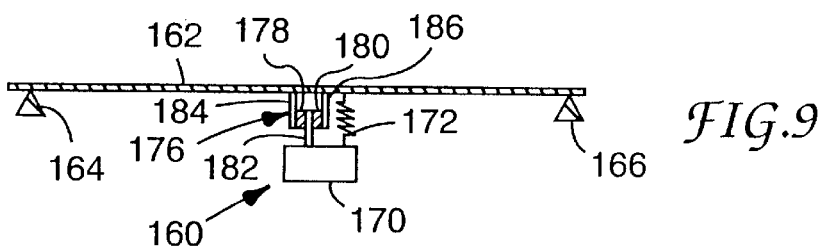
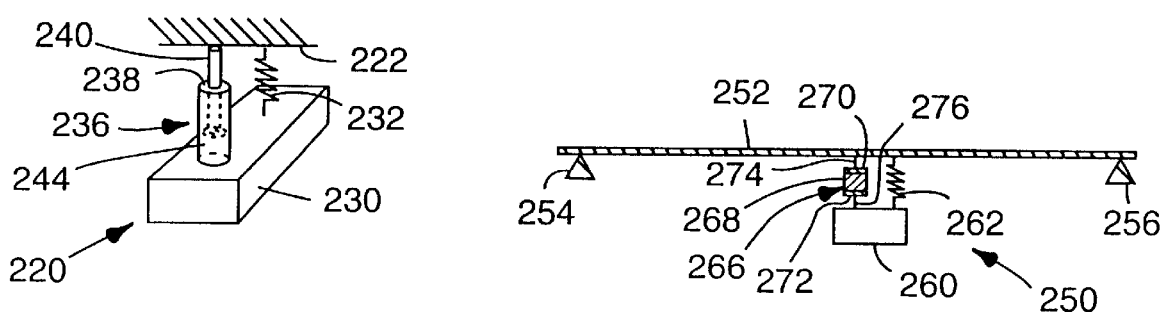

TUNED MASS DAMPER

CROSS REFERENCES TO RELATED APPLICATIONS

This application is a Continuation-In-Part of U.S. patent application Ser. No. 08/401,973, filed Mar. 9, 1995, now U.S. Pat. No. 5,558,191, which is a Continuation-In-Part of U.S. patent application Ser. No. 08/228,645, filed Apr. 18, 1994, now abandoned.

FIELD OF THE INVENTION

This invention relates to an apparatus that can be used for damping the dynamic responses of structures when the structure experiences vibrational motion resulting from momentary forces acting on the structure.

BACKGROUND

Momentary forces on a structure can induce dynamic responses into the structure, including vibrations, which can weaken the structure, subject its occupants to the unpleasantness or hazards associated with this vibratory motion, and adversely impact the performance of equipment located within the structure. Accordingly, solutions to damp these dynamic responses in structures have been sought.

For example, Japanese Patent Applications 62-328916 and 61-12569 describe damping systems having springs and dashpots suspending a secondary mass or weight from a primary mass. Japanese Patent Application 62-328916 describes a weight connected to a floor by two springs and two dashpots, for damping oscillations in the floor. Japanese Patent Application 61-12569 describes a tuned damping system where the mass of the weight, and the spring constant of the spring element are chosen such that the frequency of the system is tuned to the natural frequency of the floor or ceiling element to be damped. This tuning enhances the damping ability of the system.

Kim and Yeo, "Application of Viscoelastic Material for a Dynamic Damper" in *Journal of Vibration, Acoustics, Stress, and Reliability in Design*, Vol. 108 (July 1986) pp. 378–381, reported that some damping systems employed springs, or springs in conjunction with friction or fluid dashpots, to suspend a damper mass from a primary mass. Their paper describes a viscoelastic material under prestrain used in conjunction with a damper mass as a system for replacing the spring and dashpot damping systems.

Halverson and Hansen, "Use of Rubber Materials in Tuned Dampers for Vibration and Noise Control", in *Rubbercon '88*, describes a tuned damping system using a rubber material as the spring and damping elements between a mass element and a base structure.

Viscoelastic materials are also used in structural damping applications. For example, U.S. Pat. No. 3,605,953 to Caldwell et al., Mahmoodi, "Structural Dampers" in *Journal of the Structural Division, Proceedings of the American Society of Civil Engineers*, 1661 (August 1969), and Keel and Mahmoodi, "Design of Viscoelastic Dampers for Columbia Center Building," in *Building Motion in Wind*, Proceedings of a session sponsored by the Aerodynamics Committee of the Aerospace Division and the Wind Effects Committee of the Structural Division of the American Society of Civil Engineers in conjunction with the ASCE convention in Seattle, Wash. Apr. 8, 1986, describe dampers, which show layers of metal plates having viscoelastic material between the plates. The viscoelastic material of the dampers transfers a portion of the vibratory energy of the structure into heat, which is subsequently dissipated into the surroundings.

SUMMARY OF THE INVENTION

The present invention provides a damping system comprising a mass suspended from a structure by a spring and a viscoelastic material. The interaction between the mass, the spring and the viscoelastic material components of the damping system is such that when force is applied to the structure, creating a dynamic response therein, the system damps the vibrations associated with the dynamic response.

BRIEF DESCRIPTION OF THE DRAWINGS

The present invention will be described with reference to the accompanying drawings wherein like reference numerals identify corresponding or like components, and:

FIG. 6 is a cross sectional view of a first apparatus of the invention;

FIG. 7 is a cross sectional view of a second apparatus of the invention;

FIG. 8 is a cross sectional view of a third apparatus of the invention;

FIG. 9 is a cross sectional view of a fourth apparatus of the invention;

FIG. 11 is a partial cross sectional view of a sixth apparatus of the invention;

FIG. 12 is a cross sectional view of a seventh apparatus of the invention;

DETAILED DESCRIPTION OF THE DRAWINGS

Figure 1:
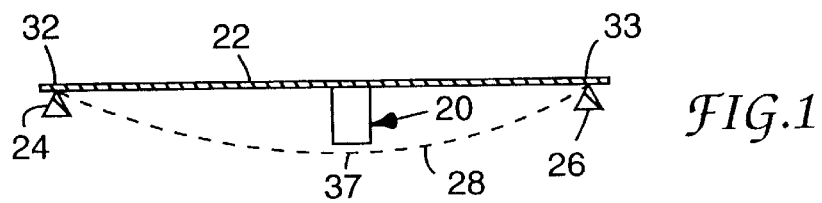
FIG. 1 is a side view of the apparatus of the present invention mounted on a simple supported beam in a first mode of vibration.
Figure 2:
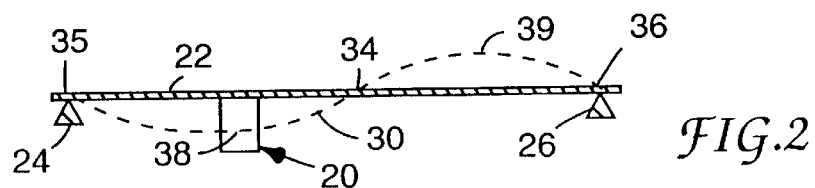
FIG. 2 is a side view of the apparatus of the present invention mounted on a simple supported beam in a second mode of vibration.

Turning now to FIGS. 1 and 2, the damping apparatus 20 of the present invention is positioned along a simple supported beam 22. The beam 22 is held in place at its ends by supports 24 and 26. In FIG. 1, broken line 28 indicates the first mode of vibration of the beam 22. In FIG. 2, broken line 30 indicates the beam 22 in a second mode of vibration.

In FIG. 1, the vibration includes nodes 32, 33 at the ends of the beam 22. In FIG. 2, the vibration includes nodes 34, 35, 36 at the center and the ends of the beam 22. For optimum damping, the apparatus 20 should be placed as close as possible to the antinodes 37, 38, 39.

Figure 3:
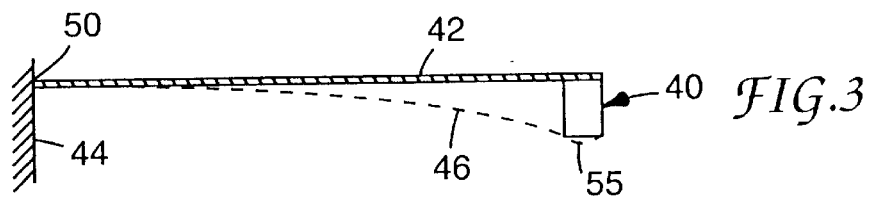
FIG. 3 is a side view of the apparatus of the present invention mounted on a cantilever beam in a first mode of vibration.
Figure 4:
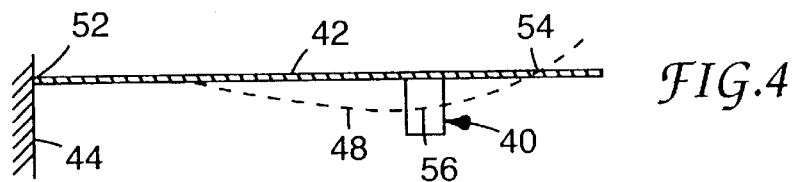
FIG. 4 is a side view of the apparatus of the present invention mounted on a cantilever beam in a second mode of vibration.

FIGS. 3 and 4 show the damping apparatus 40 of the invention positioned on a cantilever beam 42, anchored to a single support 44. Two exemplary modes of vibration are shown by broken lines 46, 48. The vibration detailed in FIG. 3 has a node 50 at the junction of the beam 42 and the support 44. The vibration detailed in FIG. 4 includes two nodes 52, 54 on the beam 42. For maximum damping, the apparatus 40 of the invention should be placed as close as possible to the antinodes 55, 56. Should the apparatus 40 be placed directly at the nodes 50, 52, 54, the damping function of the apparatus 40 will be minimal.

Figure 5:
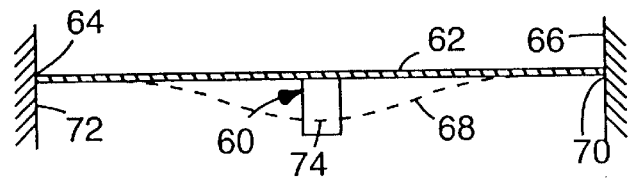
FIG. 5 is a side view of the apparatus of the present invention mounted on a clamped-clamped beam in a first mode of vibration.

In FIG. 5, the damping apparatus of the invention 60 is positioned on a clamped-clamped beam 62. The ends of this clamped-clamped beam 62 are held by supporting structures 64, 66. The mode of vibration is detailed by broken line 68, and includes nodes 70, 72, on the beam 62. Maximum damping may be achieved by placing the damping apparatus 60 as close as possible to the antinode 74.

In FIG. 6, a detailed cross section of the apparatus 80 of the present invention is shown on a cantilever beam 82. The beam 82 is mounted to a support structure 84, such as a wall or the like. The apparatus includes a housing 88 mounted to the beam 82 which encloses a secondary or damping mass 90, an associated spring 92, and laterally mounted viscoelastic elements 96, 98, which for this apparatus 80 are viscoelastic material components.

The housing 88 is normally made of metal, plastic, or other suitable material, and is attached to the beam 82 by conventional fastening techniques such as welding, mechanical fastening, adhesive bonding, or the like. The housing 88 may have an open base, although a complete enclosure, which prevents foreign matter from entering the housing 88 that could adversely impact the performance of the damping apparatus, is preferred.

The secondary mass 90, in conjunction with the spring 92 and viscoelastic elements 96, 98, damps vibrations in the beam 82 by converting them into heat energy. The secondary mass 90 is typically a block of metal, however fluid filled containers or blocks of high density materials, e.g. concrete, may also be used. Materials of lower density, such as aluminum, wood, or synthetic materials, may be utilized for applications requiring smaller secondary masses.

The spring 92 is attached to both the beam 82 and the secondary mass 90 by conventional fastening techniques such as welding, mechanical fastening, adhesive bonding or the like. Although a single spring is shown, additional springs positioned between the sides, bottom, or top of the secondary mass 90 and the base or sidewalls of the housing 88 may be used. Other types of springs such as flat springs or leaf springs which provide sufficient restoring forces may also be used.

The viscoelastic elements 96, 98 are attached at the sides of the secondary mass 90 and the sidewalls of the housing 88. The viscoelastic material which forms these elements translates the mechanical energy associated with the dynamic response, e.g., vibrations and oscillations, in the beam 82 into heat energy. The viscoelastic elements shown in FIG. 6 (as well as in FIGS. 7–10) are rectangular in cross-section. Viscoelastic elements having circular or parallelogram cross-sections may also be utilized, with appropriate adjustments in the shear cross sectional area and thickness to provide the desired damping performance. It is preferable to keep the shear forces dominant in the viscoelastic material by keeping the ratio of the dimension of the viscoelastic material parallel to the shear forces to the thickness of the viscoelastic material greater than or equal to 5.

The preferred viscoelastic material is from the Scotchdamp™ family of materials designated as SJ-2015, as described in 3M Product Information and Performance Data-Scotchdamp™ brand Vibration Control Systems, No. 70-0703-7536-8(66.1)R11 (1996), that include Scotchdamp™ SJ2015X acrylic viscoelastic polymer, types 110, 112 and 113 available from 3M, St. Paul, Minn., and described in Suggested Purchase Specification, Scotchdamp™ Viscoelastic Polymers, No. 70-0702-0225-7(89.3) R1 from 3M Industrial Tape and Specialties Division. Other suitable viscoelastic materials include but are not limited to Lord LD-400 from Lord Corporation, Erie, Pa., and Soundcoat DYAD 606, Soundcoat DYAD 609, and Soundcoat N, from Soundcoat, Inc., Deer Park, N.Y.

Viscoelastic materials are temperature sensitive. Specifically, Chang et al., "Viscoelastic Dampers as Energy Dissipation Devices for Seismic Applications" in *Earthquake Spectra*, Vol. 9, No. 3 (1993) pp. 371–387, noted that an increase in ambient temperature softens the viscoelastic material and the damping efficiency of the material decreases. Additional temperature sensitivity information on Scotchdamp™ SJ-2015 materials and SJ2015X, types 110, 112, and 113 are provided in the above-referenced Product Information and Performance Data and Suggested Purchase Specification, respectively. Accordingly, temperature changes in the viscoelastic material must be considered when constructing the apparatuses of the present invention.

The viscoelastic elements 96, 98 are preferably attached to the housing 88 and the secondary mass 90 by conventional fastening techniques such as mechanical fastening, adhesive bonding, or the like. Two viscoelastic elements 96, 98, one on each side of the secondary mass 90, connecting the secondary mass 90 to the housing 88, are preferred, but additional viscoelastlc elements may be incorporated between the housing 88 and the secondary mass 90.

In FIG. 7, the apparatus 110 of the present invention is illustrated on a simple supported beam 112, which is mounted to support structures 114, 116. The apparatus 110 includes a housing 118, mounted to the beam 112 which encloses a secondary mass 120. This secondary mass 120 is suspended vertically from the beam 112 by springs 122, 124 and laterally, by viscoelastic elements 126, 128. The viscoelastic elements 126, 128 for this apparatus 110 are viscoelastic material components. A rod 130, extending through the secondary mass 120 and joined to the base of the housing 118 and the bottom of the beam 112 by conventional fastening techniques such as welding, mechanical fastening adhesive bonding or the like, serves to constrain the secondary mass 120 to vertical movement. Alternately, the rod 130 may be joined at only the beam 112 or the base of the housing 118. Additional springs or viscoelastic elements may be used to suspend the secondary mass 120 from the beam 112.

In FIG. 8, the apparatus 140 of the present invention is illustrated on a simple supported beam 142. The beam 142 is mounted to support structures 144, 146. The apparatus 140 includes a housing 148 mounted to the beam 142 which encloses a secondary mass 150, that is suspended within the housing 148 both by flat springs 152, 154 viscoelastic elements 156, 158 having viscoelastic material components. The flat springs 152, 154 and viscoelastic elements 156, 158 are on opposite sides of the secondary mass 150. While a spring and a viscoelastic element on each side of the secondary mass are preferred, additional springs or viscoelastic elements may be used.

In FIG. 9, the apparatus 160 of the invention is illustrated in a configuration suitable for damping a simple supported beam 162. In such a system, a beam 162 is fixed at its ends by supports 164, 166. The apparatus 160 has a secondary mass 170 suspended from the beam 162 by a spring 172 and a viscoelastic element 176. The spring 172 may be fastened to the primary structure and the secondary mass 170 as described above. Although a single spring and a single viscoelastic element is shown, additional springs or viscoelastic elements may be used.

The viscoelastic element 176 represents an alternate layered design comprising viscoelastic material components 178, 180 and rigid components 182, 184, 186. This layered design increases the shear area of the viscoelastic material without significantly increasing the size of the viscoelastic element 176.

The rigid components 182, 184, 186 of the viscoelastic element 176 are made of metal or plastic, although other materials including wood or synthetics may be used. The rigid components 182, 184, 186 must be of sufficient rigidity to maximize the ability of the viscoelastic material to absorb the mechanical energy associated with the dynamic response and convert it into heat energy. The rigid components are preferably arm-like members although other suitable components may also be used. It is anticipated that the connections between viscoelastic element 176, the beam 162 and the secondary mass 170 can be reversed such that the central rigid component 182 attaches to the beam 162 while the lateral rigid components 184, 186 attach to the secondary mass 170.

Other configurations involving single or multiple portions of viscoelastic materials for the viscoelastic material components may also be used. Alternate arrangements of viscoelastic components and rigid components may also be used provided that the rigid components are attached to the beam and the secondary mass in an alternating manner, and are separated from one another by an intermediate viscoelastic component.

Figure 10:
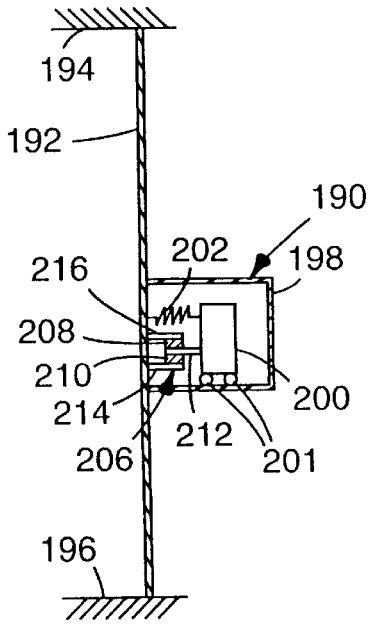
FIG. 10 is a cross sectional view of a fifth apparatus of the invention.

FIG. 10 illustrates the apparatus 190 of the present invention on a vertically mounted clamped-clamped beam 192, mounted to support structures 194, 196. The apparatus 190 includes a housing 198 mounted to the beam 192 which encloses a secondary mass 200. This secondary mass 200 is supported on rollers 201 or other structures which enable horizontal movement of the secondary mass 200. The secondary mass 200 is attached to the beam 192 by a spring 202 and a viscoelastic element 206. The viscoelastic element 206 has viscoelastic material components 208, 210 separated by a central rigid component 212 and lateral rigid components 214, 216, which are attached to beam 192 and secondary mass 200, respectively. The viscoelastic element 206 employed in this apparatus 190 is similar to that described in FIG. 9 above. Although a single spring and a single viscoelastic element are shown, additional springs or viscoelastic elements may be used.

FIG. 11 shows a damping apparatus 220 mounted on a beam 222. The apparatus 220 includes a secondary mass 230, connected to the beam 222 by a spring 232 and a viscoelastic element 236.

The viscoelastic element 236 includes a cylindrical viscoelastic material component 238, an inner cylindrical rigid component 240, which is connected at one end to the beam 222, and an outer cylindrical rigid component 244, which is connected at one end to the secondary mass 230. The cylindrical viscoelastic material component 238 is adhesively attached to the inner cylindrical rigid component 240 and the outer cylindrical component 244. The cylindrical rigid components 240, 244 are preferably attached to the beam 222 and the secondary mass 230 by the methods described above. Alternately, the inner cylindrical rigid component 240 could be attached to the secondary mass 230 and the outer cylindrical rigid component 244 could be connected to beam 222 using the above described fastening techniques. Although a single spring and a single viscoelastic element are shown, additional springs or viscoelastic elements may be used.

Turning now to FIG. 12, the apparatus 250 of the invention is illustrated on a simple supported beam 252, mounted at its ends to supports 254, 256. The apparatus 250 has a secondary mass 260 suspended from the beam 252 by a spring 262 and a viscoelastic element 266. Although a single spring and a single viscoelastic element are shown, additional springs or viscoelastic elements may be used.

The viscoelastlc element 266 for the system includes a viscoelastic material component 268, which is preferably adhesively attached, between two plates 270, 272. The plates 270, 272 are connected to rods 274, 276 by welding, mechanical fastening, adhesive bonding or the like. The rods 274, 276 are connected to the beam 252 and the secondary mass 260 respectively. The plates 270, 272 in conjunction with rods 274, 276 form the rigid component of the viscoelastic element. This sandwich-like arrangement of the viscoelastic material component 268 between the plates 270, 272 places the viscoelastic element 268 into a compression or tension mode, as opposed to the shear mode, which is common to the viscoelastic elements shown in FIGS. 6–11.

Figure 13:
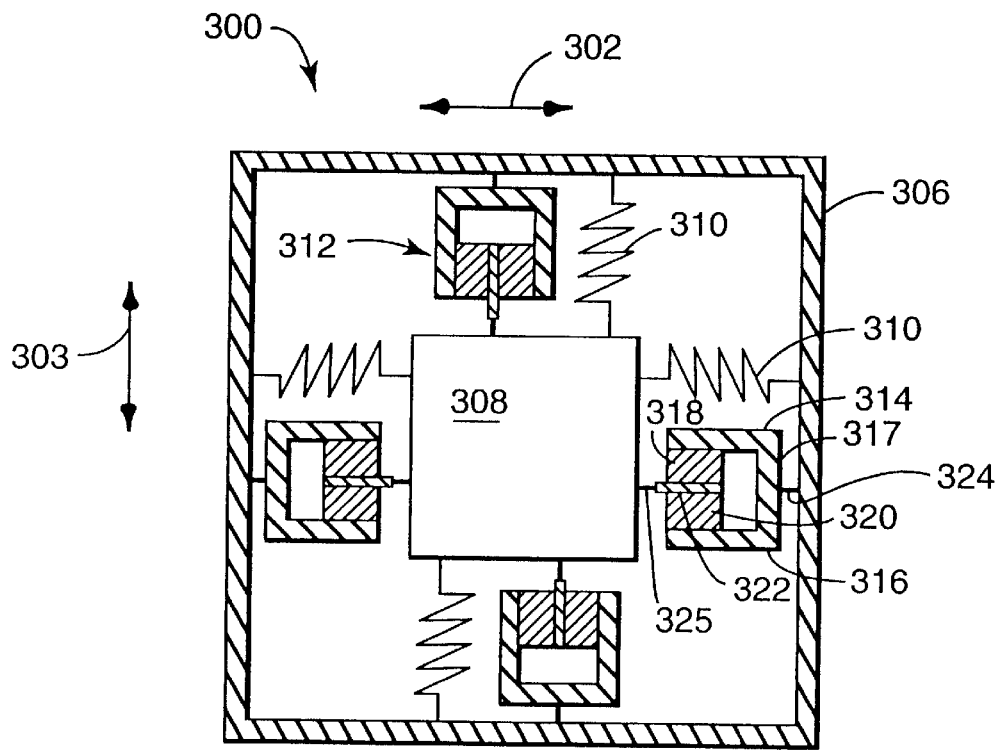
FIG. 13 is a top cross sectional view of an eighth apparatus of the present invention.

FIG. 13 details a two dimensional damping apparatus 300 of the present invention. This apparatus 300 damps vibrations along a plane in the directions of the arrows 302, 303. The apparatus 300 includes a housing 306 which is mounted to a primary structure (not shown). The housing 306 encloses a secondary mass 308, which is attached to the housing 306 by springs 310 and viscoelastic elements 312. The springs 310 are similar to those described in FIGS. 6–12 above. The spring constants of the springs 310 are adjustable through spring selection or by tuning the springs for the particular frequency desired. The viscoelastic elements 312 have lateral rigid components 314, 316, formed from U-shaped members 317, which are attached to the housing 306, and viscoelastic material components 318, 320 separated by central rigid components 322, which are attached to the secondary mass 308, respectively by pivots 324, 325. Although one pivot is preferred, multiple pivots may also be used. Alternately, the U-shaped member 317 could be attached to the secondary mass 308 by pivots and the central rigid component 322 could be attached to the housing 306 by at least one pivot. The viscoelastic elements employed in this apparatus 300 are similar to that described in FIG. 9 above. Additionally, the springs 310 may be attached to the housing 306 and/or the secondary mass 308 by pivots similar to those described for viscoelastic elements 312 above.

Figure 14:
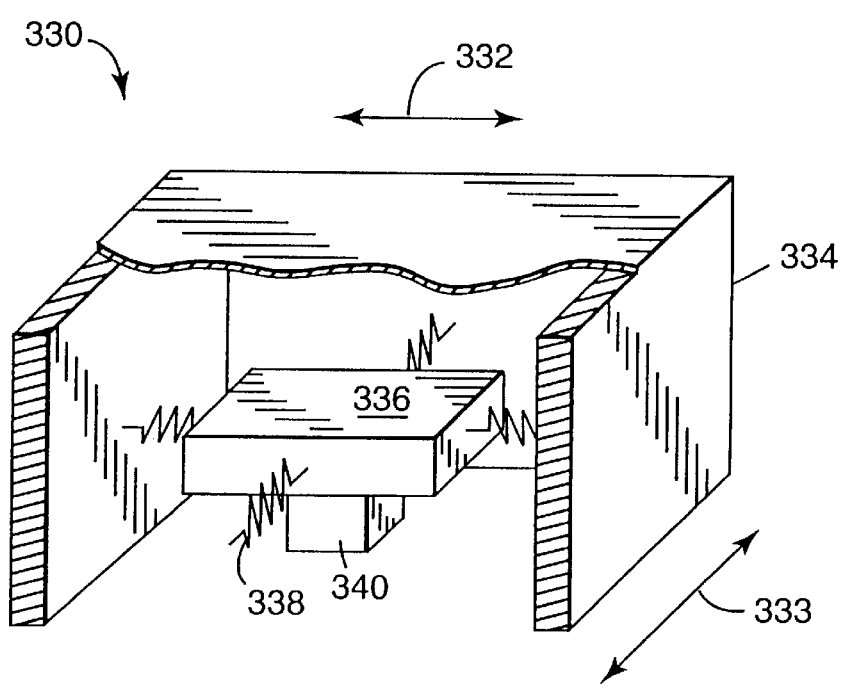
FIG. 14 is a cut away perspective view of a ninth apparatus of the present invention.

FIG. 14 shows another two dimensional damping apparatus 330 of the present invention. This apparatus 330, which damps vibrations along a plane in the directions of arrows 332, 333, includes a housing 334 which is mounted to a primary structure (not shown). The housing 334 encloses a secondary mass 336, which is attached to the housing 334 by springs 338. A viscoelastic element 340 is attached to the secondary mass 336 (and the primary structure), by the attachment methods described above.

Figure 15:
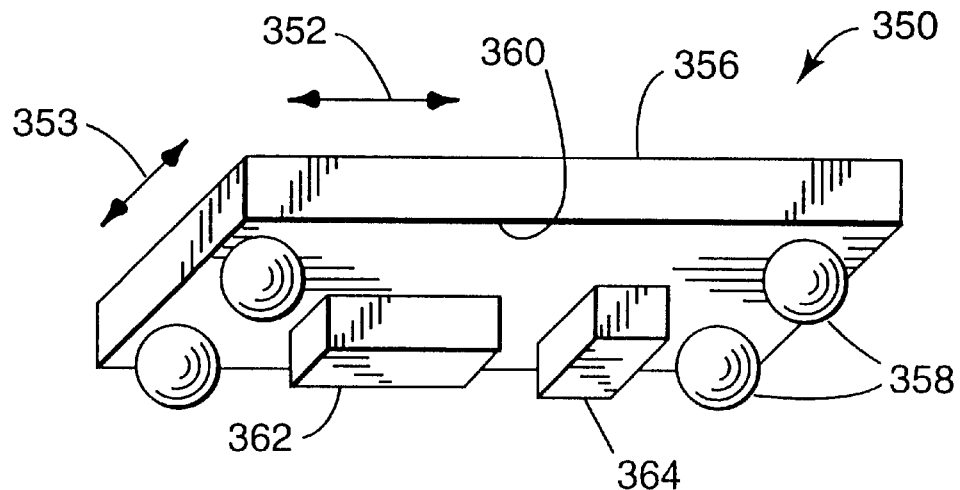
FIG. 15 is a perspective view of a tenth apparatus of the present invention.

FIG. 15 details a two dimensional damping apparatus 350 of the present invention. This apparatus 350 damps vibrations in a plane in the directions of the arrows 352, 353. The apparatus 350 includes a secondary mass 356, preferably in the form of a plate. Roller bearings 358 contact the lower surface 360 of the secondary mass 356. Movement of the roller bearings 358 is typically constrained by grooves or tracks in the primary structure and the secondary mass 356. Planar movement of the secondary mass 356 can be achieved by deploying two roller bearing tracks, each of which allow movement in a single direction at right angles to one another.

A spring 362 and viscoelastic element 364 are mounted to the lower surface 360 of the secondary mass 356. Although a single spring 362 and a single viscoelastic element 364 are shown, additional springs or viscoelastic elements may be employed.

As shown, the spring 362 is a resilient elastomeric material such as a rubber having a loss factor less than 0.15. Neoprene of a durometer 50–70 is a suitable material. Alternately, a rod could be substituted for the rubber spring 362, the rod having an unrestrictive restorative force in two dimensions. The rod is attached to the secondary mass 356 (and the primary structure) by conventional fastening techniques such as mechanical fastening, adhesive bonding or the like. The viscoelastic element 364 is attached to the secondary mass (and the primary structure) by the attachment methods described above.

Figure 16:
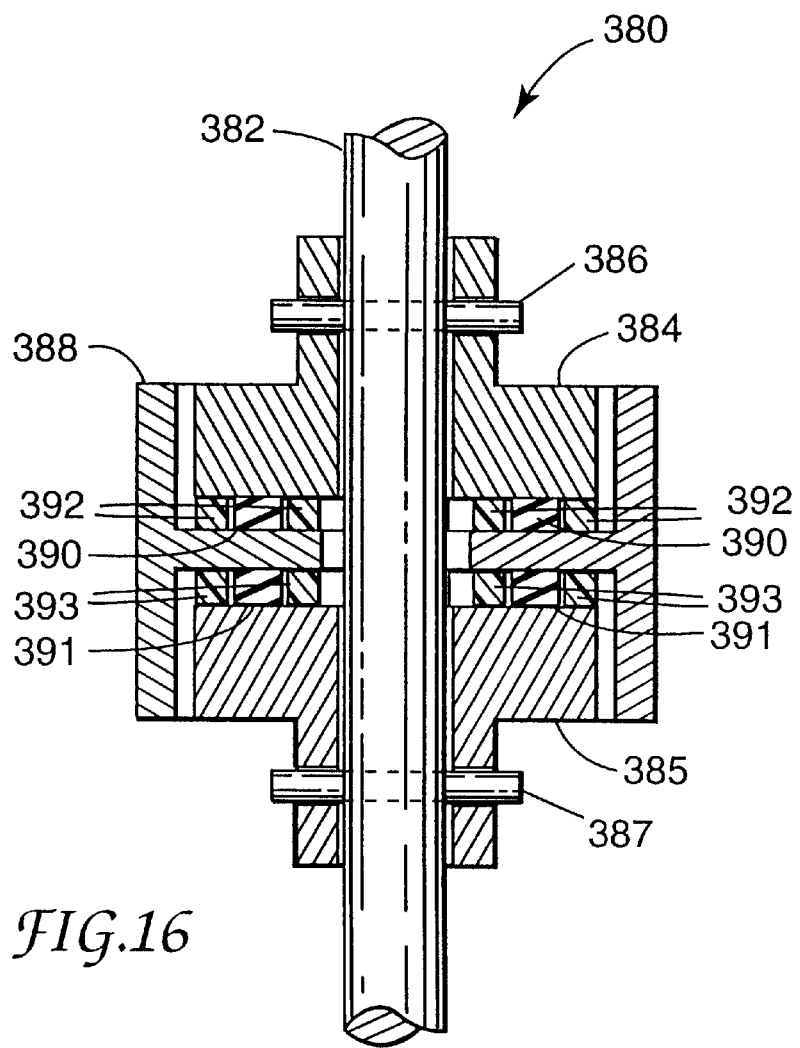
FIG. 16 is a partial cross sectional view of an eleventh apparatus of the present invention.

FIG. 16 shows a two dimensional damping apparatus 380 for a cable 382. Alternately, a bar, rod or the like could be used in place of the cable 382. The apparatus includes T-shaped circular elements 384, 385, attached to the cable 382 by pins 386, 387. This attachment can also be achieved through welds, clamps, or other conventional joining techniques. A secondary mass 388 is attached to each of the T-shaped circular elements 384, 385 by springs 390, 391 and viscoelastic elements 392, 393 interposed therebetween. While two sets of springs 390, 391 and viscoelastic elements 392, 393 are shown, additional sets of springs and viscoelastic elements may be interposed on either side of the secondary mass 388 if desired.

The T-shaped circular elements 384, 385 may be either of single or multiple piece construction, in order to be originally placed onto the cable 382 or placed on the cable 382 during a retrofit. The secondary mass 388 is preferably an H-shaped circular element. Similar to the T-shaped circular elements 384, 385, the H-shaped circular element of the secondary mass 388 may be either of single or multiple piece construction, in order to be originally placed onto the cable 382 or placed on the cable 382 during a retrofit.

The springs 390, 391 are made of a resilient elastomeric material such as a rubber having a loss factor less than 0.15. Neoprene of a durometer 50–70 would be suitable. The springs 390, 391 are attached to the T-shaped circular elements 384, 385 and the secondary mass 388 by conventional fastening techniques, such as mechanical fastening, adhesive bonding or the like. The viscoelastic elements 392, 393 are attached to the T-shaped circular elements 384, 385 and the secondary mass 388 by the attachment methods described above.

Figure 17:
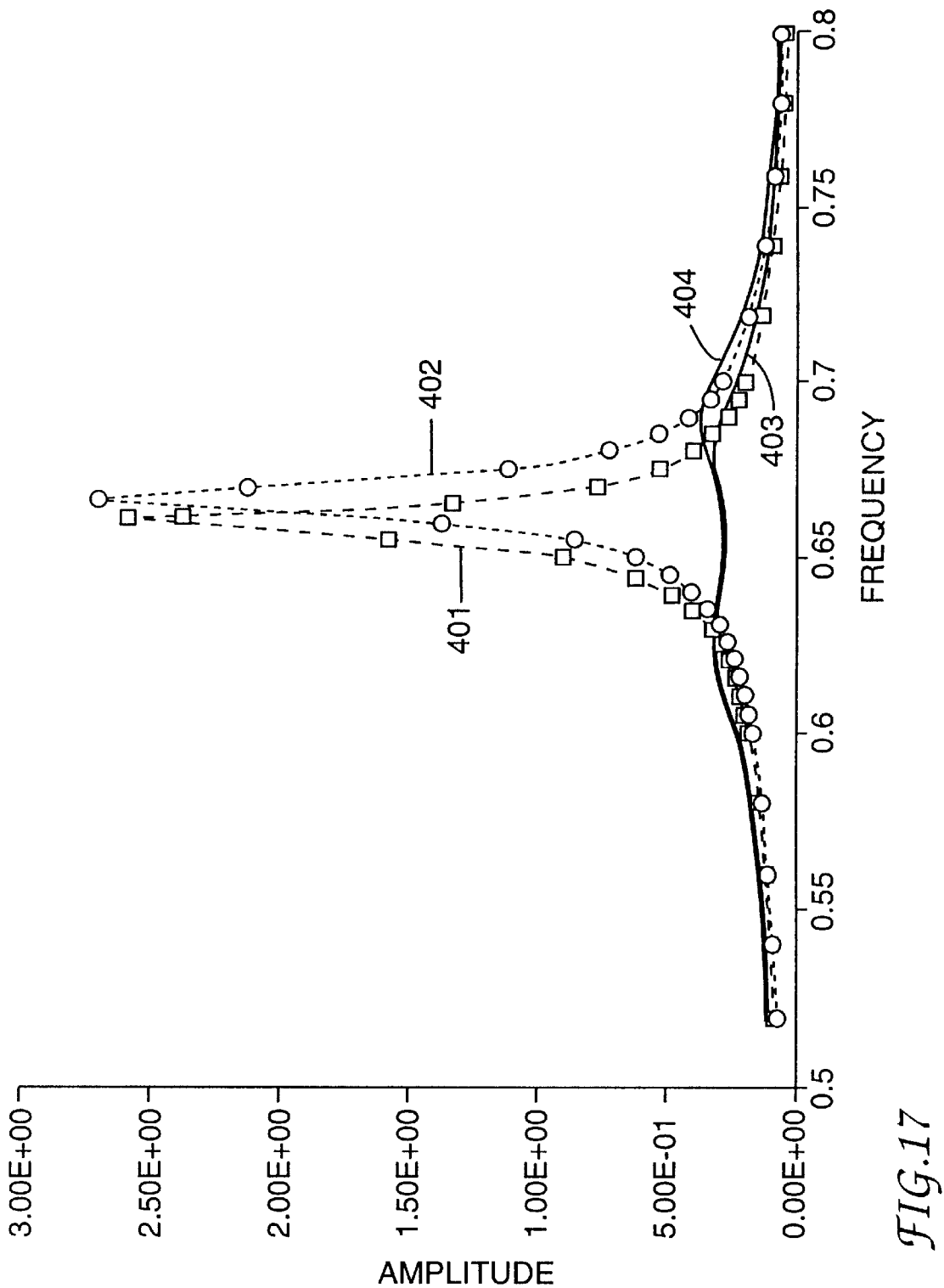
FIG. 17 is a mathematically modeled structure response curve of Amplitude versus Frequency for the structures damped by the apparatus similar to that of FIG. 15.

FIG. 17 is a mathematically modeled structure response curve employing a damping apparatus similar to that of the apparatus shown and described in FIG. 15. Lines 401 and 402 illustrate undamped responses in the X and Y directions respectively, while lines 403, 404 illustrate damped responses in the X and Y directions respectively.

Figure 18:
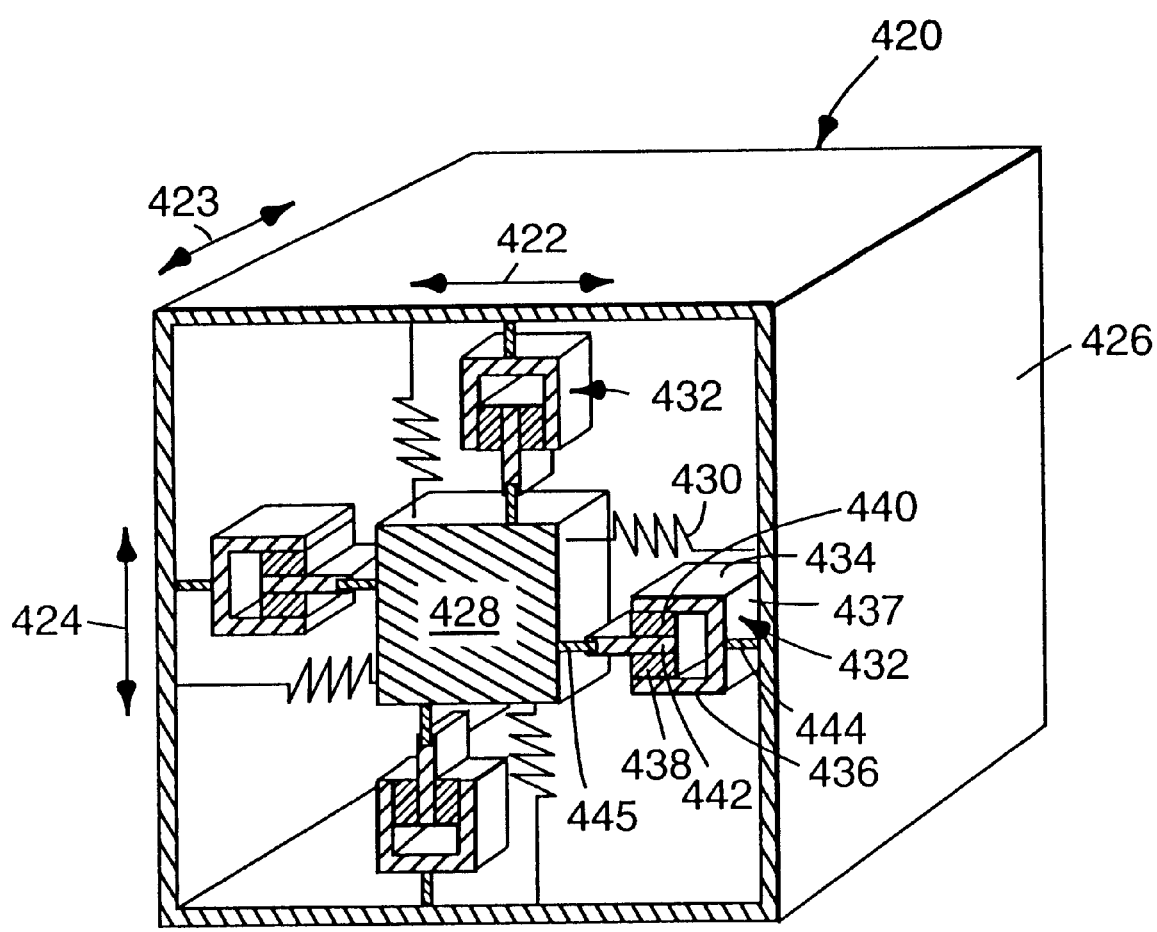
FIG. 18 is a cut away perspective view of a twelfth apparatus of the present invention.

FIG. 18 details a three dimensional damping apparatus 420 of the present invention. This apparatus 420 damps vibrations in the directions of the arrows 422, 423, 424. The apparatus 420 includes a housing 426 which is mounted to a primary structure (not shown). The housing 426 encloses a secondary mass 428, which is attached to the housing 426 by springs 430 and viscoelastic elements 432. Springs and viscoelastic elements, that would provide damping along the axis corresponding to arrow 423, are not shown due to the isometric nature of this figure, but are understood to be included with this damping apparatus 420. The springs 430 are similar to those described in FIGS. 6–12 above. The viscoelastic elements 432 have lateral rigid components 434, 436, formed from U-shaped members 437, which are attached to the housing 426, and viscoelastic material components 438, 440 separated by central rigid components 442, which are attached to the secondary mass 428, respectively by pivots 444, 445. Although one pivot is preferred, multiple pivots may also be used. Alternately, the U-shaped member 437 could be attached to the secondary mass 428 by pivots and the central rigid component 442 could be attached to the housing 426 by at least one pivot. The viscoelastic elements employed in this apparatus 420 are similar to that described in FIG. 9 above.

Figure 19:
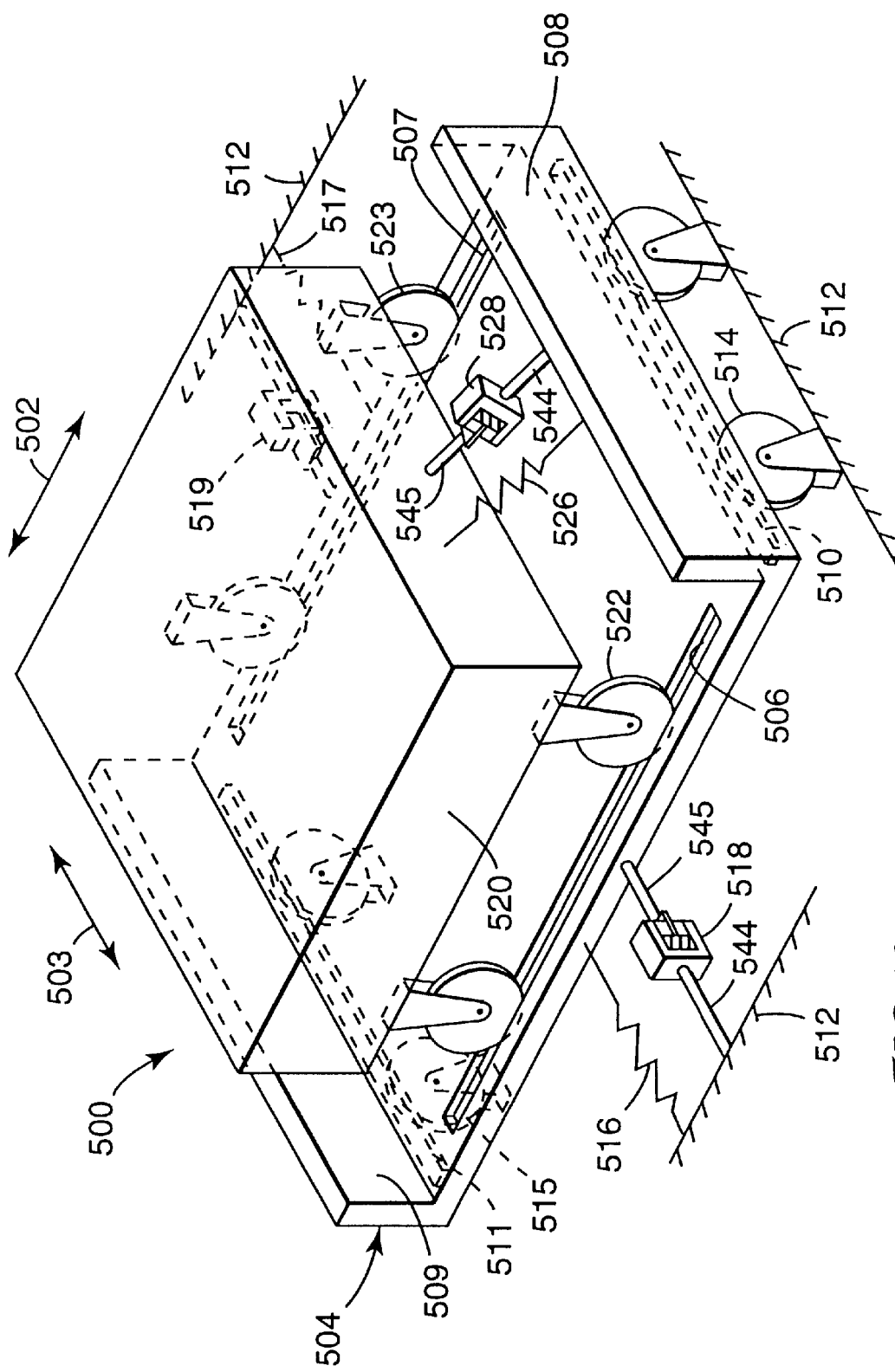
FIG. 19 is a perspective view of an thirteenth apparatus of the present invention.

FIG. 19 details an additional two dimensional damping apparatus 500 of the present invention. The apparatus 500 damps vibrations in the directions of the arrows 502, 503. The apparatus 500 includes a frame 504 with oppositely disposed upwardly opening tracks 506, 507 and oppositely disposed flanges 508, 509, with downwardly opening tracks 510, 511. These tracks 506, 507 and 510, 511 are preferably in the frame 504 but could be separate structures attached thereto. This frame 504 is attached to the primary structure 512 by both wheels 514, 515, preferably two to a side, and by springs 516, 517 and viscoelastic elements 518, 519. The springs 516, 517 and viscoelastic elements 518, 519 are relatively close to each other and central with respect to the frame 504, so as to minimize forces in the direction of arrow 502, but could be moved if desired, as long as forces in the direction of arrow 502 are minimized. While springs 516, 517 and viscoelastic elements 518, 519 are preferably arranged one of each to a side, with the springs directly across from viscoelastic elements, a spring may be directly across from the other spring and a viscoelastic element may be directly across from the other viscoelastic element. However, this directly across positioning arrangement is not required.

Multiple springs and/or viscoelastic elements are also permissible on each side, provided that upon arranging the spring(s) and viscoelastic element(s), positional considerations, as described above, are accounted for, to minimize forces in the direction of arrow 502. Their arrangement may be such that springs are positioned directly across from springs, viscoelastic elements are positioned directly across from viscoelastic elements, or alternately viscoelastic elements could be positioned directly across from springs, or combinations thereof. However, the above mentioned directly across positioning arrangement is not required.

The frame 504 attaches to a secondary mass 520 as wheels 522, 523, preferably two to a side, fit within the respective tracks 506, 507 on the frame 504. A spring 526 and a viscoelastic element 528 also attach to the secondary mass from the flanges 508, 509 of the frame 504. Springs and viscoelastic elements, identical to the spring 526 and viscoelastic element 528 shown, are located on the opposite side of the frame 504, to connect the flange 509 with the secondary mass 520, and are not shown, due to the nature of the drawing figure, but are understood to be included in this damping apparatus 500. The positioning arrangements of the springs and viscoelastic elements for connecting the frame 504, preferably at the respective flanges 508, 509, and secondary mass 520 are similar to those described above, with the springs and viscoelastic elements central with respect to the frame 504 and secondary mass 520 so as to minimize forces in the direction of arrow 503. Multiple springs and/or viscoelastic elements are also permissible in arrangements similar to those described above, provided that upon arranging the spring(s) and viscoelastic element(s), positional considerations, as described above, are accounted for, to minimize forces in the direction of arrow 503.

Additionally, the arrangements of spring(s) and viscoelastic element(s) described above, need only to connect a single side of the frame 504 to the primary structure 512, and a different single side of the frame 504 to the secondary mass 520, respectively. Alternately, if either or both of the frame 504 and the secondary mass 520 are not rectangular, at least two sets of springs and viscoelastic elements (each set including at least one spring and at least one viscoelastic element) are needed, such that a first set connecting the frame 504 to the primary structure 512, and a second set, connecting the frame 504 to the secondary mass 520, are disposed in a manner where one set is in the direction of arrow 502 and the other set is in the direction of arrow 503. Moreover, the damping apparatus 500 may include additional wheels on both the primary structure 512 and the secondary mass 520.

The springs 516, 517, 526 (and those not shown, due to the nature of the drawing figure) are similar to those described in FIGS. 6–12 above. The viscoelastic elements 518, 519, 528 (and those not shown, due to the nature of the drawing figure) are similar to those described in FIG. 18 above, and are attached to the respective, primary structure 512, portion of the frame 504, and secondary mass 520, by pivots 544, 545, these pivots being similar to these described in FIG. 18 above. Although singular pivots 544, 545 are preferred, multiple pivots may also be used.

Figure 20:
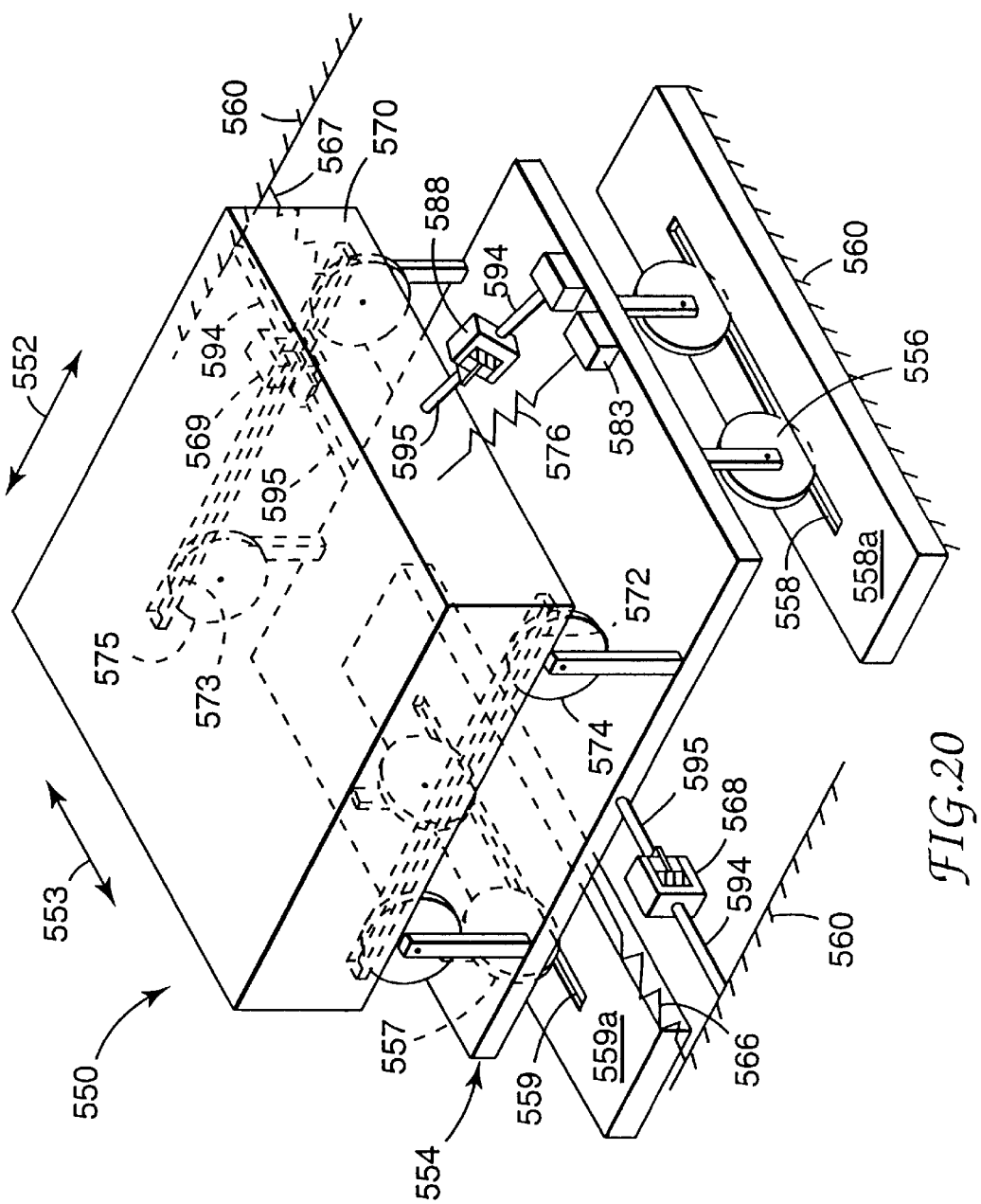
FIG. 20 is a perspective view of a fourteenth apparatus of the present invention.

FIG. 20 details an additional two dimensional damping apparatus 550 of the present invention. The apparatus 550 damps vibrations in the directions of the arrows 552, 553. The apparatus 550 includes a frame 554 on wheels 556, 557 that rest in tracks 558, 559 in blocks 558a, 559a on the primary structure 560. Alternately, the tracks 558, 559 could be within the primary structure 560. The frame 554 also attaches to the primary structure 560 by springs 566, 567 and viscoelastic elements 568, 569.

The springs 566, 567 and viscoelastic elements 568, 569 are relatively close to each other and central with respect to the frame 554, so as to minimize forces in the direction of arrow 552, but could be moved apart if desired, as long as forces in the direction of arrow 552 are minimized. While springs 566, 567 and viscoelastic elements 568, 569 are preferably arranged one of each to a side, with the springs directly across from viscoelastic elements, a spring may be directly across from the other spring and a viscoelastic element may be directly across from the other viscoelastic element. However, this directly across positioning arrangement is not required.

Multiple springs and/or viscoelastic elements are also permissible on each side, provided that upon arranging the spring(s) and viscoelastic element(s), positional considerations, as described above, are accounted for, to minimize forces in the direction of arrow 552. Their arrangement may be such that springs are positioned directly across from springs, viscoelastic elements are positioned directly across from viscoelastic elements, or alternately viscoelastic elements could be positioned directly across from springs, or combinations thereof. However, the above mentioned directly across positioning arrangement is not required.

A secondary mass 570 includes a tracks 572, 573 attached to it, for receiving wheels 574, 575, that are connected to the frame 554. Alternately, the tracks 572, 573 could be directly in the secondary mass 570. The frame 554, preferably at tabs 583, also attaches to the secondary mass 570 by a spring 586 and a viscoelastic element 588. Tabs, springs, and viscoelastic elements, identical to the tabs 583, spring 586 and viscoelastic element 588 shown, are located on the side opposite side of the frame 554 as well, and are not shown, due to the nature of the drawing figure, but are understood to be included in this damping apparatus 550. The positioning arrangements of the springs and viscoelastic elements for connecting the frame 554 and secondary mass 570 are similar to those described above, with the springs and viscoelastic elements central with respect to the frame 554 and the secondary mass 570 so as to minimize forces in the direction of arrow 553. Multiple springs and/or viscoelastic elements are also permissible in arrangements similar to those described above, provided that upon arranging the spring(s) and viscoelastic element(s), positional considerations, as described above, are accounted for, to minimize forces in the direction of arrow 553.

Additionally, the arrangements of spring(s) and viscoelastic element(s) described above, need only to connect a single side of the frame 554 to the primary structure 560, and a different single side of the frame 554 to the secondary mass 570, respectively. Alternately, if either or both of the frame 554 and the secondary mass 570 are not rectangular, at least two sets of springs and viscoelastic elements (each set including at least one spring and at least one viscoelastic element) are needed, such that a first set connecting the frame 554 to the primary structure 560, and a second set, connecting the frame 554 to the secondary mass 570, are disposed in a manner where one set is in the direction of arrow 552 and the other set is in the direction of arrow 553. Moreover, the damping apparatus 550 may include additional wheels on both the top side and the bottom side of the frame 554.

The springs 566, 567, 586 (and those not shown, due to the nature of the drawing figure) are similar to those described in FIGS. 6–12 above. The viscoelastic elements 568, 569, 588 (and those not shown, due to the nature of the drawing figure) are similar to those described in FIG. 18 above, and are attached to the respective primary structure, portion of the frame 554, and secondary mass 570 by pivots 594, 595, these pivots being similar to these described in FIG. 18 above. Although singular pivots 594, 595 are preferred, multiple pivots may also be used.

Figure 21:
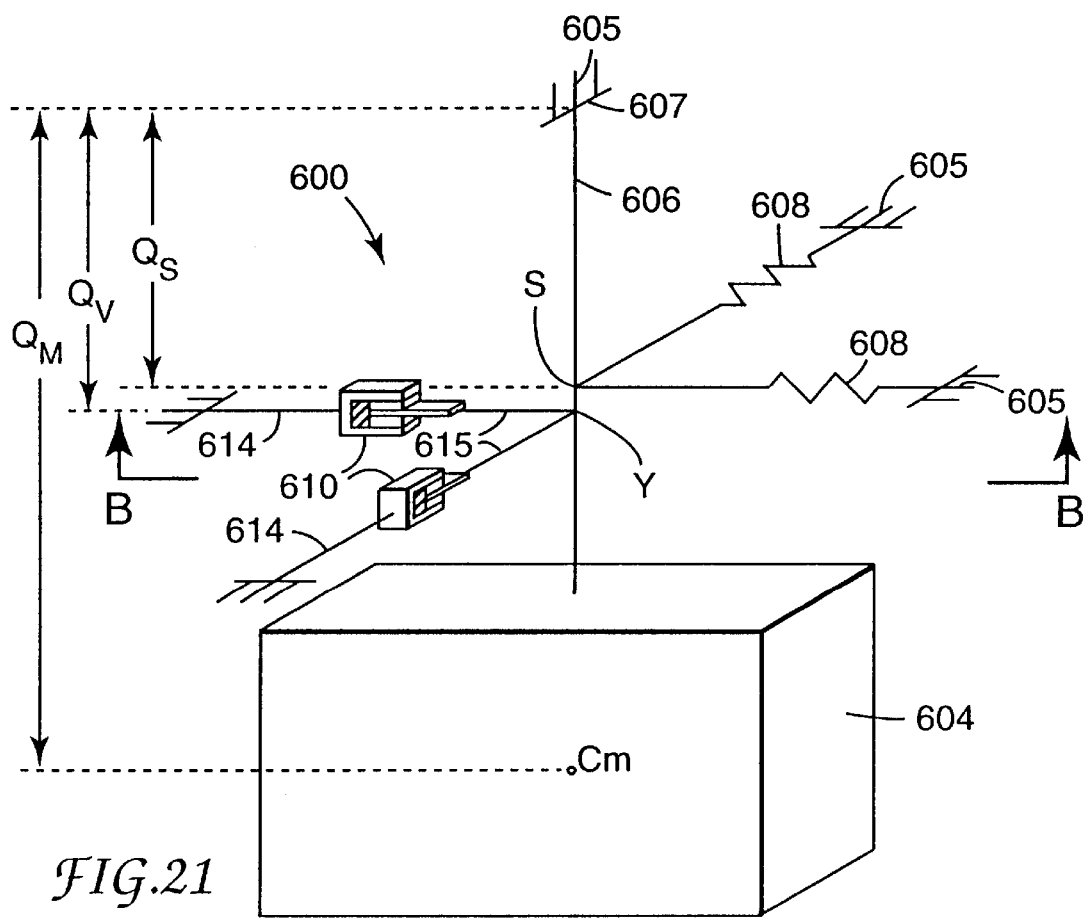
FIG. 21 is a perspective view of a fifteenth apparatus of the present invention.
Figure 22:
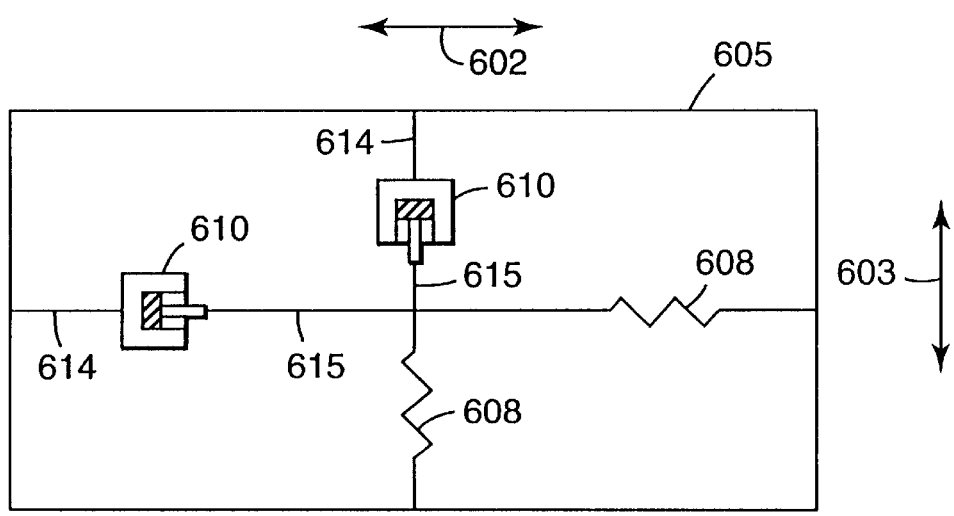
FIG. 22 is a bottom view of the apparatus of FIG. 21, along line B—B.

FIGS. 21 and 22 detail another apparatus 600 involving a pendulum structure, for damping in two dimensions, indicated by arrows 602, 603. This apparatus 600 includes a secondary mass 604 attached to a primary structure 605 by a arm 606, attached to a hinge 607. The arm 606 may be a cable, rod, beam or other member capable of sustaining the weight of the secondary mass 604. The secondary mass 604 has a center of mass ($c_m$) a distance ($Q_m$) from the primary structure 605. Springs 608 connect the primary structure 605 to the arm 606 at a point S at a distance ($Q_s$) along the arm 606 from the primary structure 605, attaching to the arm 606 preferably intermediate the secondary mass 604 and the hinge 607, while viscoelastic elements 610 connect the primary structure 603 to the arm 606 at a point V, at a distance ($Q_v$) along the arm 606 from the primary structure 605, intermediate point S and the secondary mass 604. The viscoelastic elements 610 attach to the respective primary structure 605 and arm 606 by pivots 614, 615 (at least one per side).

The springs 608 are similar to those described in FIGS. 6–12 above. The viscoelastic elements 610 are similar to those described in FIG. 18 above. The pivots 614, 615 are similar to these described in FIG. 18 above. Although singular pivots 614, 615 are preferred, multiple pivots may also be used. The springs 608 and viscoelastic elements 610 are at least 90 degrees apart from adjacent springs or viscoelastic elements. Alternately, the springs 608 and viscoelastic elements 610 could attach to the arm 606 at the same point, with each of the springs 608 and each of the viscoelastic elements 610 oppositely disposed (180 degrees) from each other. The attachment of the springs 608 and viscoelastic elements 610 could be reversed, or one spring and one viscoelastic element could attach at a first point on the arm 606, and a second spring and a second viscoelastic element could attach at a second point on the arm 606. Still alternately, the springs and viscoelastic elements could each attach at a separate point on the arm in any order, or there could be one attachment of two springs, two viscoelastic elements or a spring and a viscoelastic element, with the other two components (springs or viscoelastic elements) attached in any order to the arm.

While the two springs and two viscoelastic elements are preferred, the apparatus 600 can function with a single spring and a single viscoelastic element disposed at least 90 degrees from each other. Similarly, the present invention can employ any multiple amount of springs and viscoelastic elements, each adjacent spring and/or viscoelastic element separated by a suitable distance (preferably 360 degrees divided by the total number of springs and viscoelastic elements).

All of the above illustrations of the present invention are tuned systems. A tuned system is one in which the secondary mass and the spring constants of the springs and viscoelastic elements are designed to vibrate at approximately the natural frequency of the primary mass. Based on a series of equations associated with tuning, the dimensions of the viscoelastic material for each apparatus to be constructed in accordance with the present invention can be determined.

Tuning is accomplished in accordance with an equation for optimum tuning frequency ($\omega_{opt}$) and optimum damping ratio ($\zeta_{opt}$), to minimize the response of the primary structure. Both optimum tuning frequency ($\omega_{opt}$) and optimum damping ratio ($\zeta_{opt}$) are dependent on the mass ratio ($\mu$), determined by the mass of the secondary mass ($m_2$) divided by the effective or scaled mass of the primary structure ($m_1$) or:

$$\mu = m_2/m_1 \tag{1}$$

The scaled mass ($m_1$) is determined by multiplying the actual mass of the primary structure (M) by the scaling factor (Z) plus the mass of the housing ($M_H$) if there is a housing for the particular application or:

$$m_1 = ZM + M_H \tag{2}$$

According to Harris and Crede, *Shock and Vibration Handbook*, McGraw-Hill Book Company (1976), some typical scaling factors (Z) are: 0.375 for a clamped—clamped beam, 0.5 for a simple supported beam, 0.23 for a cantilever beam with an end load, and 0.333 for a spring, when the spring is the primary structure to be damped. Mass ratios ($\mu$) can range from 0.001 to 1.000, but normally range from 0.005 to 0.500.

Alternately, the scaled mass ($m_{1,J}$), for the Jth mode (J=1, 2, 3 . . . ) of a discrete or discretized mass primary system can be calculated by substituting equation (2) above with the following equation, assuming $M_H = 0$:

$$m_{1,J} = \frac{\phi_J^T M_p \phi_J}{\phi_{d,J}^2} = Z_J M; \; J = 1, 2, 3, \ldots \tag{2a.1}$$

where

J is the mode number (as described above);

$\phi_J$ is the mode shape vector for the Jth mode;

$\phi_J^T$ is the transpose of the mode shape vector for the Jth mode;

$M_P$ is the mass matrix for the discrete or discretized primary system;

$\phi_{d,J}$ is the mode shape value at the damper location for the Jth mode;

$Z_J$ is the scaling factor for the Jth mode; and

M is defined above.

Alternately, if a cable 382 is the primary structure, as shown in FIG. 16, the scaled mass for the Jth mode ($m_{1,J}$) of a continuous primary system with a length (D) can be calculated by substituting equation (2) above with the following equations, assuming $M_H = 0$:

$$m_{1,J} = \frac{\int_0^D \rho(x) Y_J^2(x) dx}{Y_J^2(x_d)} = Z_J M; \; J = 1, 2, 3 \ldots \tag{2b.1}$$

where

J is the mode number (defined above);

$\rho(x)$ is the mass density at location x;

$Y_J(x)$ is the mode shape function for the Jth mode;

$Y_J(x_d)$ is the mode shape value at the damper location for the Jth mode;

$Z_J$ is defined above; and

M is defined above and for a uniform cable fixed at both ends, subject to a tension force, the mode shape function ($Y_J(x)$) is:

$$Y_J(x) = \sqrt{\frac{2}{\rho D}} \sin J\pi \frac{x}{D}; \; J = 1, 2, 3 \ldots \tag{2b.2}$$

where $\rho$ is the mass density per unit length of the uniform cable;

J is the mode number as defined above; and x is a variable, a coordinate along the cable.

Equation (2b.2) is substituted into equation (2b.1), and for example, considering the first mode only (J=1), $m_{1,J}=m_1$, such that the scaling factor becomes $Z_J=Z_1$ (scaling factor Z in the first mode)=0.5 when the damping apparatus 380 (FIG. 16) is placed at the midspan of the cable (x=D/2).

The derivation of equations (2b.1) and (2b.2) can be found in L. Meirovitch, *Elements of Vibration Analysis*, McGraw-Hill, Inc., (1986), pp. 209–216.

The optimum tuning frequency ($\omega_{opt}$) and damping ratio ($\zeta_{opt}$) can be determined with known external excitation forces to the structure. They are related to the properties of the damper as:

$$\omega_{opt}^2 = \frac{k'_v + k_s}{m_2} \quad (3)$$

and $$\zeta_{opt} = \frac{\eta}{2} \frac{k'_v}{k_s + k'_v} \quad (4)$$

where $k'_v$ is the storage stiffness (spring constant) of the viscoelastic material;

$k_s$ is the stiffness (spring constant) of the spring;

$m_2$ is defined above; and $\eta$ is a temperature and frequency-dependent parameter for representing the loss factor of the viscoelastic material, and is supplied by the manufacturer.

When an elastomeric material is used as a spring element in the tuned mass damper of the present invention, it may also contribute to the damping effect. This effect can be corrected for by substituting equation (4) above, with the following equation:

$$\zeta_{opt} = \frac{\eta}{2} \frac{k'_v}{k_s + k'_v} + \frac{\eta_s}{2} \frac{k_s}{k_s + k'_v} \quad (4a.1)$$

where $\eta_s$ is the loss factor of a resilient elastomeric material.

Simultaneous solution of equations (3) and (4), or (3) and (4a.1), above provide the following expressions for spring stiffness (spring constant) of the spring ($k_s$) and storage stiffness (spring constant) of the viscoelastic material ($k'_v$), as detailed in equations (5) and (6) or equations (5a.1) and (6a.1), respectively:

$$k'_s = \left(1 - \frac{2\zeta_{opt}}{\eta}\right)\omega_{opt}^2 m_2 \quad (5)$$

$$k_s = \left(\frac{\eta - 2\zeta_{opt}}{\eta - \eta_s}\right)\omega_{opt}^2 m_2 \quad (5a.1)$$

$$k'_v = \frac{2\zeta_{opt}}{\eta}\omega_{opt}^2 m_2 \quad (6)$$

$$k'_v = \frac{(2\zeta_{opt} - \eta_s)}{(\eta - \eta_s)}\omega_{opt}^2 m_2 \quad (6a.1)$$

Alternately, if the pendulum damping apparatus 600, as shown in FIGS. 21 and 22 is employed, equations (3) and (4) above are replaced by equations (3b.1) and (4b.1) respectively as follows:

$$\omega_{opt}^2 = \frac{gm_2 + k'_v Q_v + k_s Q_s}{Q_m m_2} \quad (3b.1)$$

and $$\zeta_{opt} = \frac{\eta}{2} k'_v \frac{Q_v}{gm_2 + k'_v Q_v + K_s Q_s} \quad (4b.1)$$

where $k'_v$, $k_{s,\ m2}$ and $\eta$ are defined above;

g is a gravitational constant; and $Q_s$, $Q_v$ and $Q_m$ are distances defined above and shown in FIG. 21.

Simultaneous solution of equations (3b.1) and (4b.1) provides an expression for spring stiffness (spring constant) of the spring ($k_s$) and storage stiffness (spring constant) of the viscoelastic material ($k'_v$), as detailed in equation (5b.1) as follows:

$$\begin{bmatrix} k_s \\ k'_v \end{bmatrix} = \begin{bmatrix} Q_s & Q_v \\ -2\zeta_{opt}Q_s & (\eta - 2\zeta_{opt})Q_v \end{bmatrix}^{-1} \begin{bmatrix} (\omega_{opt}^2 m_2 Q_m) - (gm_2) \\ 2\zeta_{opt}gm_2 \end{bmatrix} \quad (5b.1)$$

A special subset occurs when there is no damping in the primary structure and the optimum tuning frequency ($\omega_{opt}$) can be defined as shown by Den Hartog, *Mechanical Vibrations*, McGraw Hill, New York, (4th ed. 1956):

$$\omega_{opt} = \omega_1 \frac{1}{1 + \mu} \quad (7)$$

where $\omega_1$ is the natural frequency of the primary structure.

In the case of the cable, as shown in FIG. 16, the natural frequency of the primary structure ($\omega_1$) and in particular the cable is:

$$\omega_1 = J\pi\sqrt{\frac{T}{\rho D^2}}\ ; J = 1, 2, 3\ldots \quad (7a.1)$$

where

J, $\rho$, D are defined in equations (2b.1) and (2b.2) above; and

T is the tension force on the cable.

Equation (7a.1) is then substituted into equation (7) in the case of the cable. Similar to equations (2b.1) and (2b.2) the derivation for equation (7a.1) is found in L. Meirovitch, *Elements of Vibration Analysis*, McGraw-Hill, Inc., (1986), pp. 209–216.

Under the same circumstances, the optimum damping ratio ($\zeta_{opt}$) can be defined as:

$$\zeta_{opt} = \sqrt{\frac{3\mu}{8(1 + \mu)^3}} \quad (8)$$

Substituting these expressions for their corresponding values in equations (5) and (6) above, the expressions for the spring constant of the spring ($k_s$) and the spring constant for the viscoelastic material ($k'_v$) become:

$$k_s = \frac{\omega_1^2 m_1 \mu}{(1+\mu)^2} \left(1 - \frac{1}{\eta} \sqrt{\frac{3\mu}{2(1+\mu)^3}}\right) \quad (9)$$

$$k'_v = \frac{\omega_1^2 m_1 \mu}{\eta} \sqrt{\frac{3\mu}{2(1+\mu)^7}} \quad (10)$$

where $\omega_1$, $m_1$, $\mu$ and $\eta$ are defined as above.

Knowing the stiffness (spring constant) ($k_s$) of the spring or springs, from equation (9) above, the spring or springs can be selected from the spring manufacturer. The spring constant of the viscoelastic material ($k'_v$) can be expressed as a function of the viscoelastic material, e.g. the cross-sectional area (A) and thickness (h) for the viscoelastic material in the shear mode as follows:

$$k'_v = \frac{G'A}{h} \quad (11)$$

where

G' is the storage shear modulus of the viscoelastic material.

The viscoelastic element or rubber spring element (FIGS. 15 and 16) may be of a thickness such that it undergoes bending. Specifically, when the thickness to length ratio of the viscoelastic material or rubber spring element is less than 1/3, the bending is negligible and need not be accounted for. However, when the thickness to length ratio is greater than 1/3, bending must be accounted for, as the apparent shear modulus ($G_{app}$, see below) can differ from the storage shear modulus (G') by more than 5%. The bending effect impacts the stiffness component of the viscoelastic material. The effect of the bending component can be experimentally determined or corrected for by determining the apparent shear modulus ($G_{app}$) in relation to the storage shear modulus (G') above the following equations:

$$G_{app} = \frac{G'}{1 + \frac{h^2}{3L^2}} \quad (11a.1)$$

where $G_{app}$ is the apparent shear modulus;

G' is the storage shear modulus of the viscoelastic material (as above);

h is the thickness of the viscoelastic material (as above); and

L is the length of the viscoelastic material in the direction of the force.

If the viscoelastic material is a cylinder, equation (11a.1) is rewritten to accommodate the cylinder as follows:

$$G_{app} = \frac{G'}{1 + \frac{h^2}{9r^2}} \quad (11a.2)$$

where r is the radius of the cylinder.

Equation (11) above can then be rearranged to determine the cross-sectional area (A) of the viscoelastic material in the shear mode as:

$$A = \frac{k'_v h}{G'} \quad (12)$$

In situations where bending corrections are necessary, as represented by equation (11a.1) and (11a.2) above, $G_{app}$ is substituted for G' in equation (11) above which is rearranged as follows:

$$A = \frac{k'_v h}{G_{app}} \quad (12a)$$

Alternately, if the viscoelastic material is in a compression or tension (FIG. 12) mode, the cross-sectional area of the viscoelastic material (A) is:

$$A = \frac{k'_v h}{E k_T} \quad (13)$$

where l is the length of the viscoelastic material in the compression or tension (FIG. 12) mode;

$k_T$ is the shape factor described in Nashof, A. D., Jones, D. I. G., and Hendersen, J. P., *Vibration Damping*, Wiley Interscience Publications, John Wiley & Sons, N.Y., 1985, pp. 194–195, given by:

$$k_T = 1 + \beta \left(\frac{A}{A'}\right)^2$$

where $\beta$ is a non-dimensional constant equal to 2 for an unfilled viscoelastic material and 1.5 for a filled viscoelastic material;

A is the cross-sectional area of the viscoelastic material;

A' is the non-load carrying area of the viscoelastic material; and

E is the storage modulus of the viscoelastic material, which, when in the compression or extension mode:

$$E = 3G' \quad (14)$$

The maximum displacement ($Y_{max}$) of the secondary mass ($m_2$) relative to the primary structure is determined, since the shear strain for the viscoelastic material ($\gamma$) is provided by the manufacturer and displacement of the secondary mass ($Y_{max}$) is related to the shear strain ($\gamma$) as follows:

$$\gamma = \frac{Y_{max}}{h} \quad (15)$$

Equation (15) can then be rearranged to determine the thickness (h):

$$h = \frac{Y_{max}}{\gamma} \quad (16)$$

In the compression or extension mode, the length (l) can be determined similarly.

In the situation where maximum displacement ($Y_{max}$) of the secondary mass ($m_2$) is unknown, the theoretical maximum displacement of the secondary mass ($m_2$) can be found by solving the coupled equations describing the motions of the secondary mass (Y(t)) relative to the effective primary mass and the effective primary mass (X(t)) respectively, where:

$$\ddot{X}(t)+2\zeta_1\omega_1\dot{X}(t)+\omega_1^2X(t)+P_1(t)2\mu\zeta_2\omega_2\dot{Y}(t)+\mu\omega_2^2Y(t) \quad (17)$$

$$\ddot{Y}(t)+2\zeta_2\omega_2\dot{Y}(t)+\omega_2^2Y(t)=-\ddot{X}(t) \quad (18)$$

where $\ddot{X}$ is the acceleration of the primary system;

$\ddot{Y}$ is the relative acceleration of the secondary mass;

$\dot{X}$ is the velocity of the primary system;

$\dot{Y}$ is the relative velocity of the secondary mass;

$\zeta_1$ is the damping ratio of the primary system;

$\zeta_2=\zeta_{opt}$ as the damping ratio of the secondary system; and $P_1(t)=F_1(t)/m_1$, and $F_1(t)$ is the external excitation force.

It is necessary to minimize the frictional interactions between the primary and secondary mass, especially in applications involving small displacements. If, for example, a damper having the basic structure illustrated in FIG. 15 is utilized, frictional interactions between the primary mass, the bearing elements, and the secondary mass must be minimized to realize optimum damping performance. The effect of the frictional component for the apparatus of FIG. 15 can be adjusted by substituting for equation (18) above, the following equation:

$$\ddot{Y}(t) + 2\zeta_2\omega_2\dot{Y}(t) + \omega_2^2Y(t) = -\ddot{X}(t) - f_d\frac{\dot{Y}}{|\dot{Y}|} \quad (18a.1)$$

where $f_d$ is the coefficient of friction (supplied by the manufacturer of the specific bearing apparatus used); and $m_2$ is the mass of the secondary mass (as defined above).

Equations (17) and (18) can be simultaneously solved using the transition matrix method as described by L. Meirovitch, *Elements of Vibration Analysis*, McGraw-Hill, Inc. (1986) pp. 477–497. Equations (17) and (18a.1) can be simultaneously solved using a numerical integration method such as the Runge-Kotta formulation. Actual solution of equations (17) and (18) by the above-referenced method is facilitated by the use of the Control System Toolbox software Version 3.0b available from The MathWorks, Inc., Natick, Mass. following the User's Guide directions provided with the software package. Actual solutions of equations (17) and (18a.1) by the above referenced method is facilitated by use of the Matlab V.4.2b functions ODE23 or ODE45 available from The MathWorks, Inc., Natick, Mass., following the User's Guide directions provided with the software package. In both cases, the solution output provided by this software package plots the relative displacement of the secondary mass as a function of time to provide an indication of the damping performance of the damping apparatus. Maximum displacement ($Y_{max}$) of the secondary mass relative to the primary structure is obtained directly from this plot and substituted into equation (16) to calculate the thickness and subsequently the dimensions of the viscoelastic material.

Although the above equations were designed for a single damper on the primary structure, they are equally applicable to systems employing multiple dampers. Adjustments of these parameters to accommodate such systems would be well known to the skilled artisan. Multi-dimensional, multi-component damping applications require that the contributions for each damper in a given direction must be independently calculated. The total damping is obtained through the summation of individual damping components along a specific direction. Adjustments of these parameters to accommodate such systems would be well known to the skilled artisan.

EXAMPLE

A tuned mass damping system was constructed in accordance with the disclosure above for a cantilever beam apparatus. The cantilever beam consisted of a steel plate 30.50 cm×12.70 cm×0.16 cm (12 in.×5 in.×0.0625 in.) and the housing for the damping system which was attached to the beam. The combined mass of the beam and housing was 546.2 gm (476.7 gm for the beam and 69.5 gm for the housing), which, using the scaling factor of 0.23 for a cantilever beam as described above and equation (2) above translates to a scaled mass of 179.1 gm. The secondary mass was selected to have a mass of 77.2 gm such that the mass ratio ($\mu$) from equation (1) above yielded $$\mu=0.43$$

From the material chosen for the cantilever, its frequency ($\omega_1$) was known to be 12 Hertz. The optimum frequency of the damper is 8.4 Hz. Additionally, the acrylic viscoelastic polymer material, Scotchdamp™ SJ 2015X type 112 had a storage shear modulus (G') of 2.46 kg/cm² (35 pounds per square inch) and a loss factor ($\eta$) of 0.9 at 24° C.

These values were then applied to equations (5)–(8) above to determine the spring stiffnesses of the spring ($k_s$) and of the viscoelastic material ($k_v'$) to yield a spring constant for the spring ($k_s$) of 0.095 kg/cm (0.53 pounds per inch) and a spring constant for the viscoelastic material ($k_v'$) of 0.11 kg/cm (0.59 pounds per inch).

Design requirements for the damping apparatus required two viscoelastic bands on opposite sides of the secondary mass ($m_2$) connected to the sidewalls of the housing, having a thickness (h) of 0.51 cm (0.2 inches). The cross-sectional area for each of the two pieces of viscoelastic material was calculated to be 0.011 cm² (0.0017 in²) using equation (12) above. Based on this calculation and a desire to use a square cross-sectional area for the viscoelastic material, an optimal dimension of 0.10 cm (0.039 inches) for each side of the square for a viscoelastic material in a pure shear mode was calculated. The dimensions of the above apparatus placed the viscoelastic material in a bending mode as well as a shear mode; resulting in the stiffness of the viscoelastic material being reduced. To compensate for this loss of stiffness, the cross-sectional area of the viscoelastic material was increased to 0.18 cm×0.23 cm per side.

A spring with a spring constant ($k_s$) of 0.095 kg/cm, as determined above was attached to both the cantilever beam and the secondary mass. The viscoelastic material having dimensions of 0.18 cm×0.23 cm×0.51 cm was adhesively attached to the secondary mass and the sidewalls of the housing. The housing was further designed to allow the secondary mass to be fixed to the housing by inserting a pin through the housing wall and into the secondary mass. Fixing the position of the secondary mass rendered the damping system inoperable and allowed a visual demonstration of the effectiveness of the damping system when the pin was removed. Foam pieces were attached to the sides of housing to reduce side impacts between the secondary mass and the housing.

With the pin in place, the beam was downwardly displaced 1.0 cm and released to initiate vibration in the beam. Vibrations gradually diminished over a period of approximately 10 seconds before they substantially subsided.

In a similar manner, the pin was removed to release the secondary mass and the beam was downwardly displaced 1.0 cm and released to initiate vibration in a damped system. In this instance, vibrations subsided in less than 0.5 seconds, demonstrating the effectiveness of the damper.

The apparatus of the present invention can be applied to small structures as well as to large structures by modifying the springs, the type and amount of viscoelastic material and the weight of the secondary or damping mass. The same principles can be applied to damping apparatuses requiring non-vertical or non-horizontal orientations.

While apparatuses of the present invention have been described so as to enable one skilled in the art to practice the techniques of the present invention, the preceding description is intended to be exemplary and should not be used to limit the scope of the invention. The scope of the invention is defined by the following claims.

What is claimed is:

1. A damping apparatus for controlling a dynamic response in a primary structure, the primary structure having a natural vibrational frequency, said damping apparatus comprising:

an arm for attaching to said primary structure;

a secondary mass attached to said arm;

at least one spring interposed between the primary structure and the arm;

at least one viscoelastic element interposed between the primary structure and the arm;

wherein said at least one spring and said at least one viscoelastic element are tuned to a frequency to provide said damping apparatus with a vibrational frequency of approximately said natural vibrational frequency of said primary structure; and whereby when a dynamic response is initiated in the primary structure, the dynamic response is damped by the movement of the secondary mass.

2. The apparatus of claim 1, wherein said at least one viscoelastic element includes a plurality of viscoelastic elements.

3. The apparatus of claim 2, wherein each of the viscoelastic elements comprise at least one viscoelastic material component.

4. The apparatus of claim 3 wherein each of the viscoelastic elements additionally comprise at least one rigid component.

5. The apparatus of claim 4 wherein at least one the viscoelastic material component is intermediate a central rigid component and lateral rigid components.

6. The apparatus of claim 1, wherein said at least one spring includes a plurality of springs.

7. An apparatus for controlling a dynamic response in a cable, the cable having a natural vibrational frequency, said damping apparatus comprising:

a secondary mass;

a plurality of support members for said secondary mass, said support members attached to said cable and disposed on opposite sides of said secondary mass;

at least one spring interposed between each of said support members and the secondary mass;

at least one viscoelastic element interposed between each of said support members and the secondary mass;

wherein said at least one spring and said at least one viscoelastic element are tuned to a frequency to provide said damping apparatus with a vibrational frequency of approximately said natural frequency of said cable; and whereby when a dynamic response is initiated in the cable, the dynamic response is damped by the movement of the secondary mass.

8. The damping apparatus of claim 1, wherein the arm comprises a pendulum.

* * * * *